United States Patent
DeVault et al.

(10) Patent No.: US 11,958,625 B1
(45) Date of Patent: Apr. 16, 2024

(54) AERODYNAMIC HYDROGEN TANKS

(71) Applicant: ZeroAvia, Inc., Hollister, CA (US)

(72) Inventors: Gabriel DeVault, Santa Cruz, CA (US); Jacob T. Needels, Palo Alto, CA (US)

(73) Assignee: ZEROAVIA, INC., Hollister, CA (US)

( * ) Notice: Subject to any disclaimer, the term of this patent is extended or adjusted under 35 U.S.C. 154(b) by 0 days.

(21) Appl. No.: 18/339,932

(22) Filed: Jun. 22, 2023

(51) Int. Cl.
| | |
|---|---|
| *B64D 37/04* | (2006.01) |
| *B64D 1/02* | (2006.01) |
| *B64D 5/00* | (2006.01) |
| *B64D 27/24* | (2006.01) |
| *B64D 37/10* | (2006.01) |
| *B64D 37/12* | (2006.01) |
| *B64D 37/30* | (2006.01) |

(52) U.S. Cl.
CPC .............. *B64D 37/04* (2013.01); *B64D 1/02* (2013.01); *B64D 5/00* (2013.01); *B64D 37/10* (2013.01); *B64D 37/12* (2013.01); *B64D 37/30* (2013.01); *B64D 27/24* (2013.01)

(58) Field of Classification Search
CPC ........ B64D 37/12; B64D 37/26; B64D 37/10; B64D 37/30; B64D 37/32; B64D 2045/0085
See application file for complete search history.

(56) References Cited

U.S. PATENT DOCUMENTS

| | | | | |
|---|---|---|---|---|
| 2,124,867 A | * | 7/1938 | Akerman ............... | B64D 37/12 244/3 |
| 2,575,534 A | * | 11/1951 | Stoughton .............. | B64D 37/12 244/135 R |
| 2,764,374 A | * | 9/1956 | Cook, Jr. ............... | B64D 37/12 244/135 R |
| 2,777,655 A | * | 1/1957 | Graham ................. | B64D 37/12 D12/333 |
| 2,867,396 A | * | 1/1959 | Johnson ................. | B64D 37/12 294/82.26 |
| 2,951,664 A | * | 9/1960 | Smith .................... | B64D 37/12 244/135 R |
| 3,009,671 A | * | 11/1961 | Johnson ................. | B64D 37/04 244/135 R |
| 4,306,693 A | * | 12/1981 | Cooper .................. | B64D 37/12 244/140 |
| 4,790,350 A | * | 12/1988 | Arnold ................... | B64D 37/12 220/4.15 |

(Continued)

*Primary Examiner* — Joshua J Michener
*Assistant Examiner* — Michael B. Kreiner
(74) *Attorney, Agent, or Firm* — HAYES SOLOWAY P.C.

(57) ABSTRACT

A cryogenic fuel tank for retrofitting a conventional fossil-fuel-powered aircraft, or for a purposely built aircraft to run on hydrogen has an aerodynamically shaped outer surface including an ogive shaped nose cone, and a tapered tail cone, wherein the tapered tail cone includes actively adjustable elements for adjusting aerodynamic characteristics of the cryogenic fuel tank. The cryogenic fuel tank is configured to be attached below wings of the aircraft, through support pylons, which include sensors configured to measure forces applied by the cryogenic fuel tank to the airframe. The cryogenic fuel tank includes a nozzle and valve configured to vent gas from the cryogenic fuel tank by expansion through the nozzle in the event that the cryogenic fuel tank is jettisoned from the aircraft.

19 Claims, 4 Drawing Sheets

(56) References Cited

U.S. PATENT DOCUMENTS

| | | | | |
|---|---|---|---|---|
| 6,347,719 B1* | 2/2002 | Rosen | | B64D 37/30 |
| | | | | 220/586 |
| 6,742,741 B1* | 6/2004 | Rivoli | | B64D 27/06 |
| | | | | 244/93 |
| 7,610,841 B2* | 11/2009 | Padan | | B64D 37/12 |
| | | | | 89/1.8 |
| 7,624,946 B2* | 12/2009 | Schoene | | F17C 1/00 |
| | | | | 244/172.3 |
| 8,016,238 B2* | 9/2011 | Padan | | B64D 37/12 |
| | | | | 244/135 C |
| 8,950,195 B2* | 2/2015 | Watts | | B64D 37/02 |
| | | | | 62/48.2 |
| 9,701,416 B2* | 7/2017 | Epstein | | F02C 7/224 |
| 9,734,109 B2* | 8/2017 | Ray | | G06F 13/385 |
| 9,752,728 B2* | 9/2017 | Tang | | F17C 7/04 |
| 10,501,184 B2* | 12/2019 | Nipper | | B64D 37/12 |
| 10,866,594 B2* | 12/2020 | Tillotson | | B64D 5/00 |
| 11,686,634 B2* | 6/2023 | Kumar | | B64D 27/26 |
| | | | | 73/774 |
| 11,732,652 B2* | 8/2023 | Sibbach | | B64D 37/30 |
| | | | | 60/736 |
| 2006/0108476 A1* | 5/2006 | Padan | | B64D 37/12 |
| | | | | 244/135 R |
| 2009/0205845 A1* | 8/2009 | Hoffman | | A62C 3/025 |
| | | | | 701/2 |
| 2013/0306797 A1* | 11/2013 | Dalle Donne | | B64D 37/12 |
| | | | | 244/135 R |
| 2019/0248473 A1* | 8/2019 | Kang | | B64C 29/0033 |
| 2021/0261263 A1* | 8/2021 | Schelfaut | | B64D 27/10 |
| 2022/0355942 A1* | 11/2022 | Pome | | B64D 27/24 |
| 2022/0371743 A1* | 11/2022 | Allain | | B64D 37/04 |
| 2023/0123465 A1* | 4/2023 | Devault | | B60L 58/30 |
| | | | | 244/30 |
| 2023/0143288 A1* | 5/2023 | Orchard | | F17C 1/12 |
| | | | | 244/135 R |

* cited by examiner

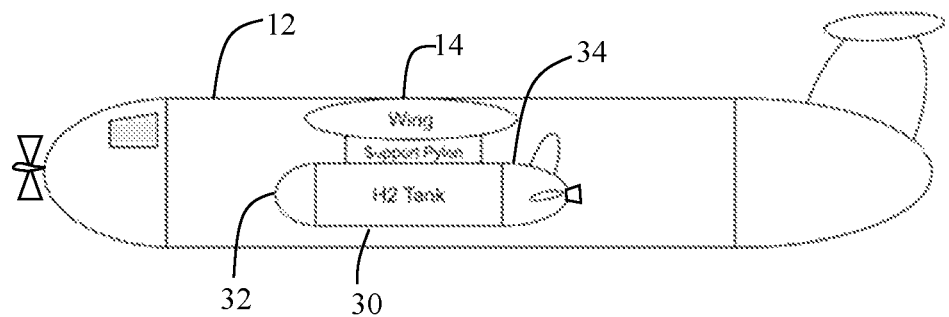
FIG. 2
FIG. 3A
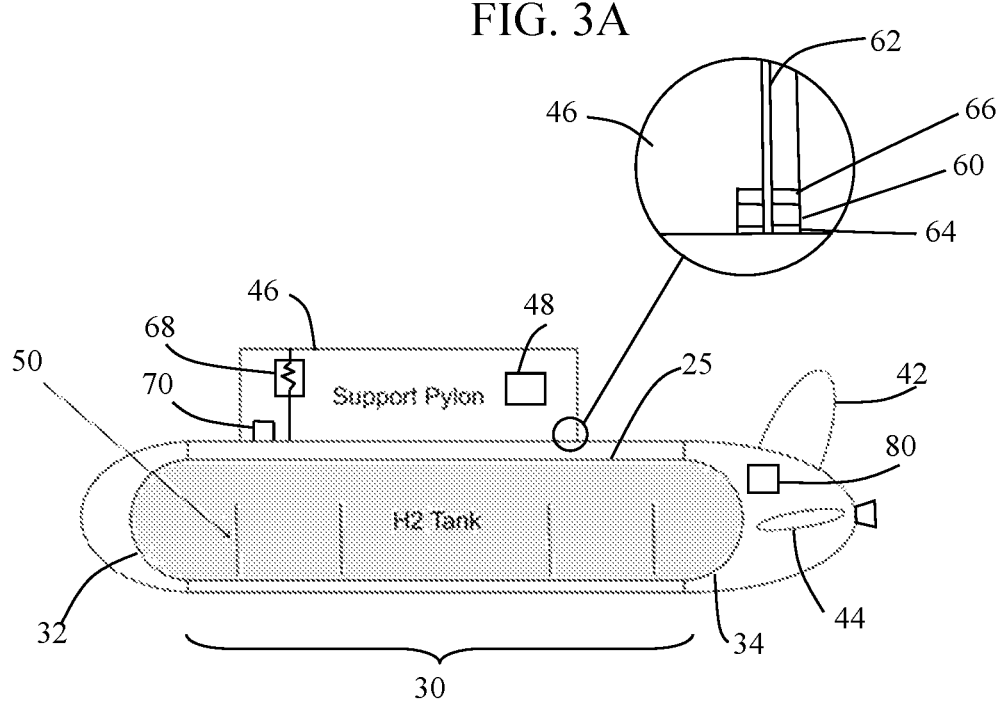
FIG. 3

AERODYNAMIC HYDROGEN TANKS

TECHNICAL FIELD

The present disclosure relates to clean energy-based transportation systems. The disclosure has particular utility in connection with hydrogen-powered aircraft and, in particular, aircraft powered by electric power generated by hydrogen fuel cells and will be described in such utility, although other utilities are contemplated, including aircraft powered by hydrogen-burning internal combustion engines including jet engines.

BACKGROUND AND SUMMARY

This section provides background information related to the present disclosure which is not necessarily prior art. This section provides a general summary of the disclosure and is not a comprehensive disclosure of its full scope or all its features.

Exhaust emissions from transport vehicles are a significant contributor to climate change. Conventional fossil-fuel-powered aircraft engines release $CO_2$ emissions. Also, fossil-fuel-powered aircraft emissions include non-$CO_2$ effects due to nitrogen oxide (NOx), vapor trails and cloud formation triggered by the altitude at which aircraft operate. These non-$CO_2$ effects are believed to contribute twice as much to global warming as aircraft $CO_2$ and are estimated to be responsible for two-thirds of aviation's climate impact. Additionally, the high-speed exhaust gasses of conventional fossil-fuel-powered aircraft engines contribute significantly to the extremely large noise footprint of commercial and military aircraft, particularly in densely populated areas.

Moreover, in surveillance and defense applications, the high engine noise and exhaust temperatures of conventional fossil fuel burning engines significantly hamper the ability of aircraft to avoid detection and, therefore, reduce the mission capabilities of the aircraft.

Rechargeable battery-powered terrestrial vehicles, i.e., "EVs", are slowly replacing conventional fossil-fuel-powered terrestrial vehicles. However, the weight and limited energy storage of batteries makes rechargeable, battery-powered aircraft generally impractical.

Hydrogen fuel cells offer an attractive alternative to fossil fuel burning engines. Hydrogen fuel cell tanks may be quickly filled and store significant energy, and other than the relatively small amount of unreacted hydrogen gas, the reaction exhaust from hydrogen fuel cells comprises essentially only water.

While purposely built hydrogen fuel cell powered aircraft are being designed and tested, converting and retrofitting conventional fossil-fuel-powered airframes to be powered by hydrogen ($H_2$) provides an attractive alternative to purposely built hydrogen fuel cell powered aircraft.

Converting and retrofitting a conventional fossil-fuel-powered aircraft to run on hydrogen-powered fuel cells involves replacing the fossil-fuel-powered engine, fuel tanks and assorted fuel lines, fuel pumps and various valves, sensors, gauges, and instruments specific to a conventional fossil-fuel-powered engine, by an electric powered engine, a source of electricity, typically, a hydrogen fuel cell configured to generate electricity, and cryogenic fuel tanks for storing hydrogen either in liquid or gaseous form.

Retrofitting aircraft to run on hydrogen ($H_2$) requires cryogenic fuel tanks of larger volume than the fossil fuel tanks being replaced, to hold sufficient compressed $H_2$ gas or $H_2$ liquid to power the aircraft for a desired range. The commonly proposed solution of mounting $H_2$ cryogenic fuel tanks under the aircraft wings results in changes to wing aerodynamic characteristics (e.g., lift, drag, moment distribution) and wing structural loads (e.g., point loads, wing weight distribution) which can affect both aerodynamic stability and aeroelastic response, as well as increase drag.

Unlike conventional $H_2$ cryogenic fuel tanks that typically are cylindrical in shape with blunt, rounded caps, in accordance with the present disclosure, we configure the shape of the $H_2$ cryogenic fuel tanks to make them more aerodynamic by shaping them as an ogive nose with a cylindrical body and conical narrowing at the tail. We also provide our shaped cryogenic tank bodies with $H_2$ flowpaths or flow channels in couplers, typically mounting bosses on the tank, whereby to eliminate the necessity for additional $H_2$ plumbing connections. In one aspect, we equip our $H_2$ cryogenic fuel tanks with active aerodynamic control surfaces and components to compensate for added weight and drag, and aerodynamic and structural loads. In some embodiments, active aero components are configured to guide a dropped or jettisoned fuel tank (e.g., in an emergency situation where a hard landing may occur), and valving and nozzles are included so that $H_2$ vented from the tank optionally may be used for propulsion. Active aerodynamic control has been employed on winglets on conventional aircraft but, heretofore, not on dropped or jettisoned tanks to compensate for loads while attached to the wing. Active aerodynamic control has been employed to guide Joint Direct Attack Munition (JDAM) munitions but heretofore not in connection with dropped or jettisoned fuel tanks. Nor has tank venting heretofore been used to propel dropped or jettisoned drop tanks. As a consequence, in an emergency scenario, where it may be necessary to jettison an $H_2$ tank before landing to ensure passenger safety, active aerodynamic elements may be used to guide a jettisoned tank away from the plane and to a safe landing location, e.g., under autopilot control, using venting $H_2$ gas to provide thrust for maneuvering.

Retrofitting aircraft with $H_2$ cryogenic fuel tanks wherein, in the original aircraft design, the fossil fuel load was distributed within the wing, typically requires wing modifications to accommodate additional loads. Modifying the aerodynamic properties and mounting method of the tanks in accordance with the present disclosure allows for retrofitting aircraft with minimal or no modifications to the wing structure. Active aerodynamic elements on our cryogenic fuel tanks also can be used to improve aerodynamic performance, reduce stall speed, compensate for mass property changes, and improve stability of the aircraft in flight. In one aspect of the disclosure, we include couplers for mounting in the cryogenic fuel tank, which include $H_2$ flowpaths or flow channels integrated into the mountings.

In accordance with the present disclosure, a $H_2$ cryogenic fuel tank is manufactured in an aerodynamic shape, for example by forming a composite filament outer tank body with front and rear caps configured to improve aerodynamic characteristics. Specifically, the rear cap is rearwardly tapered (e.g., 5 to 15 degrees, preferably 7 to 13 degrees, more preferably –10 degrees) and the front cap is shaped as an ogive nose cone. In one embodiment, the nose cone is constructed of an energy absorbing material to reduce the possibility of damage in the event of an impact (e.g., bird strike). The nose cone shape is designed to enable maintenance of laminar flow over the tank body. Couplers are designed to include flowpaths or flow channels for the Hz, thus eliminating the need for a separate $H_2$ piping system. Hardpoints for mounting, containing the $H_2$ flowpaths, preferably are integrally formed, i.e., in the composite filament winding process, to allow for an integrated mounting/ plumbing system at points of connection. In some embodiments, the tank outer mold line (OML) may be shaped to blend with the wing lower surface. In another embodiment, a fairing is included around the mounting points to protect the connection carrying $H_2$ from impact (e.g., bird strike).

Active aerodynamic elements (such as wings, rudders, elevators) are provided on surfaces of the cryogenic fuel tank, changing the aerodynamic characteristics of the tank, and which may be adjusted resulting in forces and moments on the aircraft wing. Specifically, the tank/fuel center of gravity (CG) may be adjusted to be ahead of the mounting location, and tank center of pressure (CP) may be adjusted to be behind the mounting point. This enables aerodynamic stability of the tank system.

In one embodiment, support pylons for the tank include a strain gauge or gauges or other force sensors to measure forces applied by the tank assembly to the airframe. A controller is provided, configured to interpret those signals to detect trim conditions. The controller may interpret those sensor signals and adjust the aerodynamic elements to minimize loads, avoid aeroelastic divergence, or augment other aerodynamic interactions with the airframe. Also, active control of tank CG can be accomplished by dividing the tank by internal dividers into two or more bays and using a fuel pumping system to transfer fuel between bays, as needed.

A feature and advantage of the instant disclosure is that, in the event of an emergency landing, the $H_2$ cryogenic fuel tanks can be jettisoned. Optionally active aerodynamic elements can be used to guide the tanks away from the aircraft, or to a safe landing zone, e.g., under autopilot control. In one embodiment, a thermal/pressure relief device in the tank tail can be used to vent $H_2$ from the jettisoned tank and the vented $H_2$ used to propel the tank by expansion through a nozzle.

In another embodiment, to handle an over-pressure or over-temperature event, a pressure relief device (PRD) is provided to vent fuel in a safe direction. Venting may be up and aft which are safe directions both in flight and while on the ground. Typically, the PRDs are housed in a tail cone of the tank to protect the PRDs from bird strikes or other impact damage.

More particularly, in accordance with Aspect A of the present disclosure, there is a provided cryogenic fuel tank for aircraft, said cryogenic fuel tank having an aerodynamically shaped outer surface including an ogive shaped nose cone and a tapered tail cone, wherein said cryogenic fuel tank includes actively adjustable elements for adjusting aerodynamic characteristics of the cryogenic fuel tank.

In one aspect, the cryogenic fuel tank is configured to be attached below wings of the aircraft.

In another aspect, the cryogenic fuel tank is configured to be attached to wings of the aircraft through support pylons.

In a further aspect, the support pylons include sensors configured to measure forces applied by the cryogenic tank to the airframe.

In yet another aspect, the support sensors include strain gauges.

In a still further aspect, the cryogenic fuel tank further includes a controller configured to interpret signals from the sensors and to configure the aerodynamic elements to adjust loads on the aircraft.

In yet another aspect, the cryogenic fuel tank includes thermal dividers for dividing the cryogenic fuel tank into two or more bays and further including the pumping system to transfer fuel between bays to control the cryogenic fuel tank center of gravity.

In a further aspect, the cryogenic fuel tank further includes pressure relief devices configured to vent fuel away from the cryogenic fuel tank in the event of over-pressure or over-temperature.

In another aspect, the cryogenic fuel tank further includes a valve and nozzle configured to vent fuel from the cryogenic fuel tank in the event that the cryogenic fuel tank is jettisoned from the aircraft, where the venting fuel expanded through the nozzle can be used to propel the fuel tank.

In a further aspect, the cryogenic fuel tank further comprises a controller, configured to control venting of the fuel.

According to Aspect B, the present disclosure also provides an aircraft vehicle configured to be propelled by a cryogenic fuel, and comprising a cryogenic fuel tank having a generally egg-shaped outer surface including an ogive shaped nose cone, a cylindrical body, and a tapered tail cone, wherein said tapered tail cone includes actively adjustable elements for adjusting aerodynamic characteristics of the fuel tank.

In one aspect the aircraft comprises a hydrogen fuel cell powered aircraft.

In another aspect the aircraft vehicle comprises a fossil fuel burning aircraft vehicle retrofitted to run on hydrogen.

In still another aspect the aircraft comprises a purposely built hydrogen fuel cell powered aircraft.

In a further aspect the cryogenic fuel tank is positioned below the wings of the aircraft.

In a further aspect the cryogenic fuel tank is supported below wings of the aircraft through pylons.

In a further aspect the cryogenic fuel tank is fixed to the pylons through integrally joined couplers which include flowpaths or flow channels configured for carrying fuel from an interior of the cryogenic fuel tanks to a power train on the aircraft.

In yet another aspect the pylons include ullage controls and/or gasifier heat exchanger.

In a further aspect the coupler includes hard point fittings for mounting to support pylons, wherein the hard point fittings are configured to release the tanks so that they may be dropped or jettisoned under emergency conditions.

In still another aspect the cryogenic fuel tank includes a controller configured to control venting of gas from the tank cryogenic fuel under emergency conditions.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

Further features and advantages of the disclosure will be seen in the following detailed description, taken in conjunction with the accompanying drawings. The drawings described herein are for illustrative purposes only of selected embodiments and not all possible implementations and are not intended to limit the scope of the present disclosure.

In the drawings:

FIG. 2 is a side elevational view of the aircraft of FIG. 1;

FIG. 3 is a side elevational view, in partial section, showing details of a cryogenic tank in accordance with one embodiment of the disclosure, and FIG. 3A is an enlarged view showing details of a boss element of the cryogenic tank;

DETAILED DESCRIPTION

Figure 1:
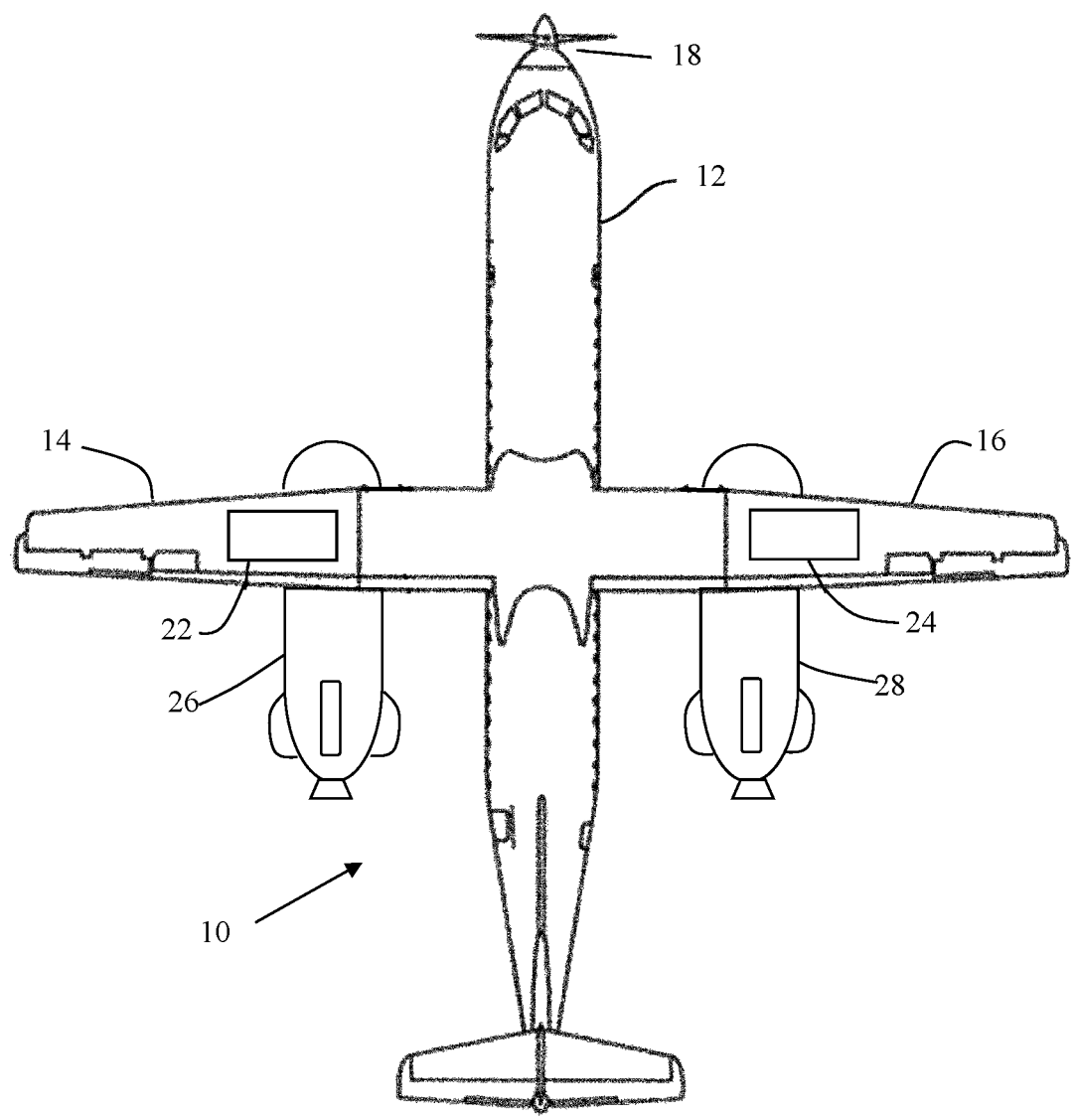
FIG. 1 is a top plan view of an aircraft in accordance with the present disclosure.
Figure 4:
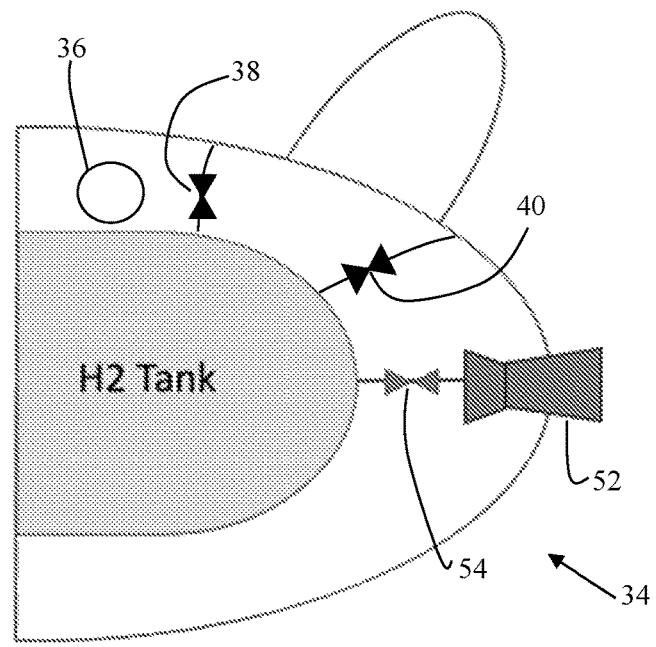
FIG. 4 is a detailed sectional view showing elements of the tail end of cryogenic tank in accordance with the present disclosure.

Example embodiments will now be described more fully with reference to the accompanying drawings. Example embodiments are provided so that this disclosure will be thorough and will fully convey the scope to those who are skilled in the art. Numerous specific details are set forth, such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having" are inclusive and therefore specify the presence of stated features, integers, steps, operations, elements, and/or components but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected, or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers, and/or sections should not be limited by these terms. These terms may be only used to distinguish one element, component, region, layer, or section from another element, component, region, layer, or section. Terms such as "first," "second," and other numerical terms when used herein do not imply a sequence or order unless clearly indicated by the context. Thus, a first element, component, region, layer, or section discussed below could be termed a second element, component, region, layer, or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Referring to FIG. 1, an airplane 10 in accordance with the present disclosure includes a fuselage 12, wings 14, 16, and an electric motor driven propulsor 18. Propulsor 18 is powered by fuel cells 22, 24 carried within the wings 14, 16. Alternatively, fuel cells 22, 24 may be carried within the fuselage 12.

Referring also to FIGS. 2-5, a pair of cryogenic fuel tanks 26, 28 are mounted below the wings 14, 16.

Tanks 26, 28 each include an insulated inner cryogenic tank 25 and a shell comprising a tank main body section 30, having an ogive nose cone section 32 which is shaped to minimize drag using natural laminar flow, boundary layer control or other industry-standard techniques. Tank main body section 30 is generally cylindrically shaped and may have a slightly convex central portion. Each tank 26, 28 includes a tail cone section 34 tapered for optimal pressure recovery to minimize drag. Specifically, tail cone section 34 is rearwardly tapered 5 to 15 degrees, preferably 7 to 13 degrees, more specifically ~10 degrees. Tail cone section 34 may include fill ports 36, emergency dump valves 38, and pressure relief and thermal relief valves 40. Also, in a preferred embodiment, tail cone section 34 may include a nozzle or nozzles 52 connected via valve(s) 54 to the hydrogen tank so that hydrogen fuel can be vented through valve(s) 54 and expanded from nozzle 52 providing thrust for a jettisoned tank as will be discussed below.

The tank surface/volume ratio should be minimized to reduce heat conducted into the tank, consistent with low induced and parasite drag from the airframe.

Tanks 26, 28 are supported below the wings 14, 16 by support pylons 46. Support pylons 46 are shaped to minimize drag and may include ullage controls and hydrogen gasifier heat exchangers 48. Alternatively, the hydrogen gasifier heat exchanger may be carried within the wings or the fuselage of the aircraft. Support pylons 46 also may include connection/disconnection fittings as will be discussed below.

Tanks 26, 28 also includes aerodynamic elements optimized to minimize structural torsion loads transferred to the aircraft including vertical fins 42 to control yaw motions or loads, and horizontal fins 44 to control pitch motions or loads.

Figure 5:
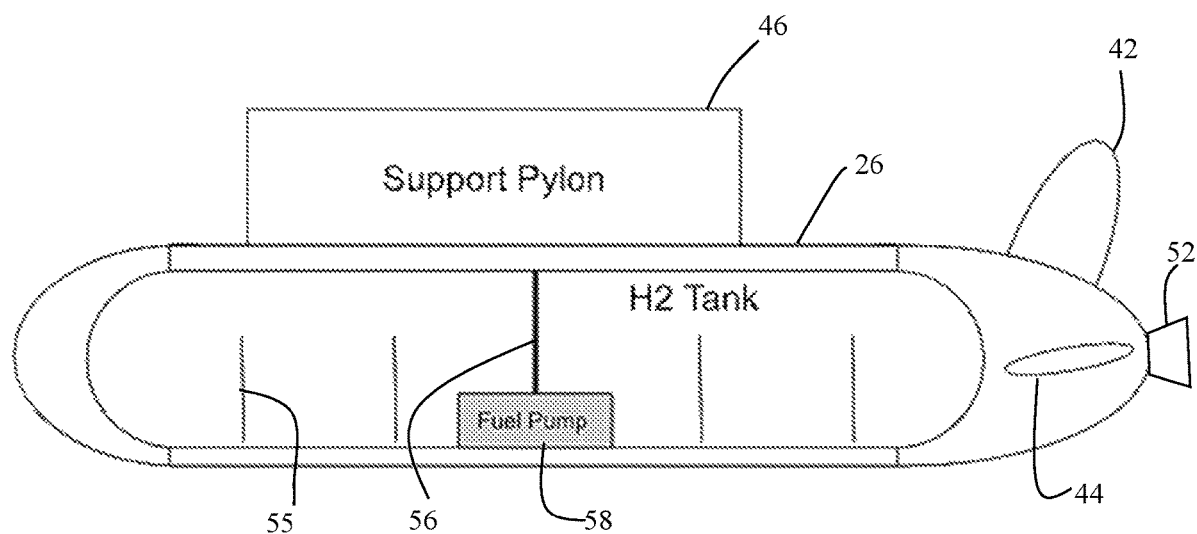
FIG. 5 is a view similar to FIG. 3 of another embodiment of cryogenic fuel tank in accordance with the present disclosure.

The tanks 26, 28 also may include internal baffles 50 to reduce sloshing of fuel. Alternatively, as shown in FIG. 5, the tanks also may be divided into two or more bays divided either by baffles 55 or divider(s) 56. In the cases where the tanks are divided into two or more bays, fuel pumps 58 may be provided to transfer fuel between bays to allow for active control of the tank center of gravity during use. Dividing the tanks into two or more bays also has an advantage in that if one of the bays develops a leak or the tank is otherwise damaged, for example, by a bird strike, the plane may safely be flown and landed on fuel in the undamaged tank bay.

Referring in particular to FIG. 3A, the tanks 26, 28 are connected to the aircraft via support pylons 46 via couplers 60. Couplers 60 preferably include flowpaths or flow channels 62 configured for carrying $H_2$ from the interior of the tanks for connection to the fuel cells 22, 24. In practice, the tank outer shell is formed of a strong lightweight material such as composite filament material. Couplers 60 may include hard point fittings 64 formed integrally with or attached to the tank outer shell and include hard points for mounting to the support pylons 46. The mountings also may include fixtures 66 that can be activated to release the tanks 26, 28 so that they may be dropped or jettisoned under emergency conditions. The support pylons 46 also may include strain gauges 68 and sensors 70 configured to measure structural torsion loads and aerodynamic forces on the support pylons so that the vertical and horizontal fins 42, 44 may be trimmed as necessary to minimize strain.

Figure 6:
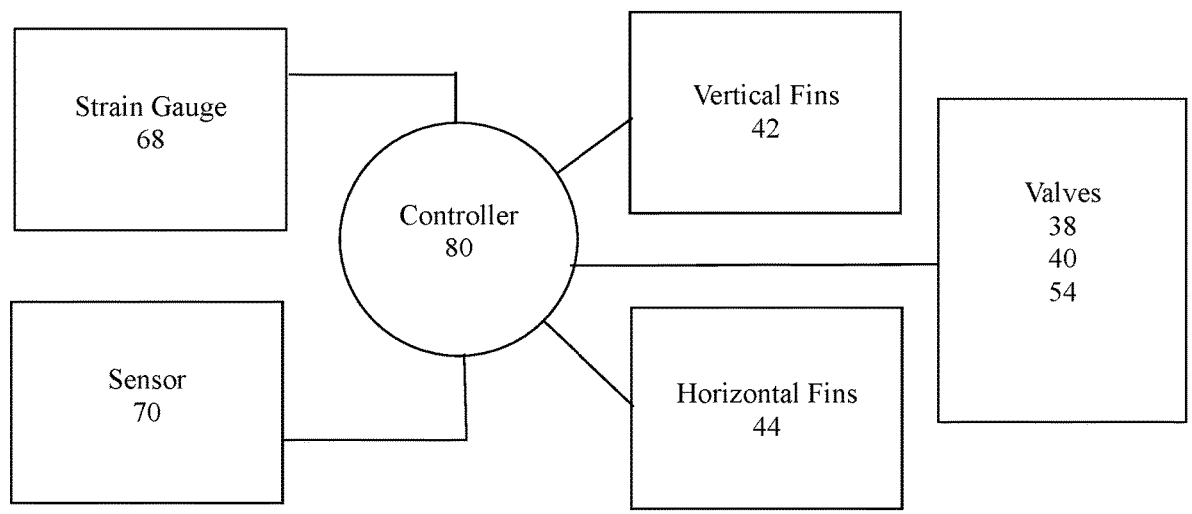
FIG. 6 is a block diagram of a controller configured for use with an aircraft of FIG. 1.

Referring also to FIG. 6, a control system 80 is provided for controlling the vertical fins 42 and horizontal fins 44 based on signals received from strain gauges and sensors in the support pylons. Controller 80 also may be configured to control the flight path of a jettison tank away from the aircraft.

While the foregoing disclosure has been described in connection with converting and retrofitting a fossil-fuel-powered aircraft to a fuel cell powered electric propulsor driven aircraft, the disclosure similarly may be used for converting a fossil fuel burning aircraft to a hydrogen gas burning aircraft by replacing the fossil fuel tanks of the aircraft and related apparatus with cryogenic hydrogen fuel tanks in accordance with the present disclosure. Also, while the disclosure has been directed specifically to converting and retrofitting a conventional fossil fuel driven aircraft with a hydrogen driven power train, the above-described cryogenic fuel tank design principles including aerodynamic shape, nose cone and tail cone shape, internal baffle designs, venting and nozzle designs, etc., also advantageously may be employed in purposely built hydrogen fuel powered aircraft.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure. Various changes and advantages may be made in the above disclosure without departing from the spirit and scope thereof.

What is claimed:

1. A cryogenic fuel tank for aircraft, said cryogenic fuel tank having an aerodynamically shaped outer surface including an ogive shaped nose cone and a tapered tail cone, wherein said cryogenic fuel tank includes actively adjustable elements for adjusting aerodynamic characteristics of the cryogenic fuel tank; wherein the cryogenic fuel tank further includes a valve and nozzle configured to vent fuel from the tank in the event that the cryogenic fuel tank is jettisoned from the aircraft, where the venting fuel expanded through the nozzle can be used to propel the fuel tank.

2. The cryogenic fuel tank of claim 1, wherein the cryogenic fuel tank is configured to be attached below wings of the aircraft.

3. The cryogenic fuel tank of claim 2, wherein the cryogenic fuel tank is configured to be attached to wings of the aircraft through support pylons.

4. The cryogenic fuel tank of claim 3, wherein the support pylons include sensors configured to measure forces applied by the cryogenic fuel tank to the airframe.

5. The cryogenic fuel tank of claim 4, wherein the support sensors include strain gauges.

6. The cryogenic fuel tank of claim 4, further including a controller configured to interpret signals from the sensors and to configure the aerodynamic elements to adjust loads on the aircraft.

7. The cryogenic fuel tank of claim 1, wherein the cryogenic tank includes dividers for dividing the cryogenic fuel tank into two or more bays and further including a pumping system to transfer fuel between bays to control the cryogenic fuel tank center of gravity.

8. The cryogenic fuel tank of claim 1, wherein the cryogenic tank further includes pressure relief devices configured to vent fuel away from the cryogenic fuel tank in the event of over-pressure or over-temperature.

9. The cryogenic fuel tank of claim 1, further comprising a controller configured to control venting of the fuel.

10. An aircraft vehicle configured to be propelled by a cryogenic fuel and comprising a cryogenic fuel tank as claimed in claim 1.

11. The aircraft vehicle as claimed in claim 10, wherein the aircraft comprises a hydrogen fuel cell powered aircraft.

12. The aircraft vehicle as claimed in claim 10, wherein the aircraft vehicle comprises a fossil-fuel-burning aircraft vehicle retrofitted to run on hydrogen.

13. The aircraft vehicle as claimed in claim 10, wherein the aircraft comprises a purposely built hydrogen fuel cell powered aircraft.

14. The aircraft vehicle of claim 10, wherein the cryogenic fuel tank is positioned below the wings of the aircraft.

15. The aircraft vehicle of claim 14, wherein the pylons include ullage controls and/or gasifier heat exchangers.

16. The aircraft vehicle of claim 10, wherein the cryogenic tank is supported below wings of the aircraft through pylons.

17. The aircraft vehicle of claim 16, wherein the cryogenic fuel tank is fixed to the pylons through integrally formed couplers, which include flowpaths or flow channels configured for carrying fuel from an interior of the cryogenic fuel tank to a power train on the aircraft.

18. The aircraft vehicle of claim 17, wherein the couplers include hard point fittings for mounting to support pylons, wherein the hard point fittings are configured to release the cryogenic fuel tanks so that they may be dropped or jettisoned under emergency conditions.

19. The aircraft vehicle of claim 18, wherein the cryogenic fuel tank includes a controller configured to control venting of fuel from the cryogenic fuel tank under emergency conditions.

\* \* \* \* \*